US012209744B2

(12) United States Patent
Stööd

(10) Patent No.: US 12,209,744 B2
(45) Date of Patent: Jan. 28, 2025

(54) INDOOR LIGHTING AND CLIMATE SYSTEM

(71) Applicant: Jan Stööd, Hammarö (SE)

(72) Inventor: Jan Stööd, Hammarö (SE)

( * ) Notice: Subject to any disclaimer, the term of this patent is extended or adjusted under 35 U.S.C. 154(b) by 308 days.

(21) Appl. No.: 17/293,881

(22) PCT Filed: Nov. 12, 2019

(86) PCT No.: PCT/SE2019/051146
§ 371 (c)(1),
(2) Date: May 13, 2021

(87) PCT Pub. No.: WO2020/101560
PCT Pub. Date: May 22, 2020

(65) Prior Publication Data

US 2022/0010956 A1 Jan. 13, 2022

(30) Foreign Application Priority Data

Nov. 13, 2018 (SE) .................................... 1851412-5

(51) Int. Cl.
*F21V 33/00* (2006.01)
*F21V 15/01* (2006.01)
(Continued)

(52) U.S. Cl.
CPC .......... *F21V 33/0092* (2013.01); *F21V 15/01* (2013.01); *F21V 29/673* (2015.01); (Continued)

(58) Field of Classification Search
CPC .......... F21V 29/60–677; F21V 33/0092; F21S 8/02–028; A61L 9/18; F24F 3/056; F24F 13/078
See application file for complete search history.

(56) References Cited

U.S. PATENT DOCUMENTS 2,730,942 A 1/1956 Peterson
3,010,378 A 11/1961 Geocaris
(Continued)

FOREIGN PATENT DOCUMENTS

CN 2324471 Y 6/1999
CN 2669038 Y 1/2005
(Continued)

OTHER PUBLICATIONS

"Smart HVAC controls for any building" Loxone, Retrieved from: https://www.loxone.com/enus/products/room-climate/, Retrieved on: Aug. 16, 2021.
(Continued)

*Primary Examiner* — Mariceli Santiago
(74) *Attorney, Agent, or Firm* — Maschoff Brennan

(57) ABSTRACT

An indoor lighting and climate system includes a plurality of lighting units arranged in a dispersed manner in a room and a control unit arranged to control the operation of the lighting units in relation to preset climate settings and input signals from at least one temperature sensor, wherein each of said lighting units include a cup shaped housing with an opening, a lamp attachment fora lamp, an open inside space between said lamp and said cup shaped housing, and a fan arranged to produce a forced air flow in said space, characterized in that a circumferentially extending inner dividing wall member is arranged within said cup shaped housing, which circumferentially extending dividing wall separates said open inside space from a heat flow channel arranged within said cup shaped housing.

15 Claims, 4 Drawing Sheets

(51) Int. Cl.

| | |
|---|---|
| ***F21V 29/67*** | (2015.01) |
| ***F24D 15/00*** | (2022.01) |
| ***F24F 11/74*** | (2018.01) |
| ***F24F 13/02*** | (2006.01) |
| ***F24F 13/08*** | (2006.01) |
| ***F24F 13/28*** | (2006.01) |
| ***F25B 21/02*** | (2006.01) |

(52) U.S. Cl.
CPC .............. *F24D 15/00* (2013.01); *F24F 11/74* (2018.01); *F24F 13/08* (2013.01); *F24F 13/28* (2013.01); *F25B 21/02* (2013.01); *F24F 13/0263* (2013.01); *F24F 2221/02* (2013.01)

(56) References Cited

U.S. PATENT DOCUMENTS

| | | | |
|---|---|---|---|
| 3,326,112 | A | 6/1967 | Reichner et al. |
| 3,393,728 | A | 7/1968 | Noel |
| 3,420,439 | A | 1/1969 | Meckler |
| 3,885,462 | A | 5/1975 | Krook |
| 3,949,809 | A | 4/1976 | Gilles |
| 4,024,728 | A | 5/1977 | Gustafsson |
| 6,095,671 | A | 8/2000 | Hutain |
| 8,651,704 | B1 | 2/2014 | Gordin et al. |
| 8,926,133 | B2 | 1/2015 | Booth |
| 9,518,723 | B2 | 12/2016 | Ticktin et al. |
| 2003/0111219 | A1 | 6/2003 | Edwards |
| 2005/0109490 | A1 | 5/2005 | Harmon et al. |
| 2005/0111234 | A1 | 5/2005 | Martin et al. |
| 2008/0165535 | A1 | 7/2008 | Mazzochette |
| 2008/0212333 | A1 | 9/2008 | Chen |
| 2009/0032604 | A1 | 2/2009 | Miller |
| 2010/0053967 | A1 | 3/2010 | Bertram et al. |
| 2010/0149798 | A1* | 6/2010 | Scott ..................... F21V 29/677 362/249.02 |
| 2010/0307716 | A1 | 12/2010 | Bean, Jr. et al. |
| 2011/0267829 | A1* | 11/2011 | Horng ................... F21V 29/677 362/373 |
| 2014/0043810 | A1* | 2/2014 | Jo ........................... F21V 29/83 362/373 |

FOREIGN PATENT DOCUMENTS

| | | | | | |
|---|---|---|---|---|---|
| CN | 2816657 | Y | | 9/2006 | |
| CN | 1854632 | A | | 11/2006 | |
| CN | 102461357 | B | | 11/2013 | |
| CN | 104833019 | A | | 8/2015 | |
| CN | 105318465 | A | | 2/2016 | |
| DE | 3136222 | A1 | | 3/1983 | |
| EP | 0657701 | A2 | | 6/2001 | |
| EP | 2080648 | A1 | | 7/2009 | |
| EP | 2525137 | A1 | * | 11/2012 | .............. F21S 8/026 |
| EP | 2570719 | A1 | * | 3/2013 | .............. F21S 8/026 |
| JP | 02134612 | U | * | 11/1990 | |
| JP | 4145689 | B2 | | 9/2008 | |
| JP | 2012069395 | A | * | 4/2012 | ............... F21K 9/20 |
| KR | 20040062668 | A | | 7/2004 | |
| KR | 20110000359 | A | | 1/2011 | |
| KR | 20110038416 | A | * | 4/2011 | |
| WO | WO-2010046536 | A1 | * | 4/2010 | .......... F21V 33/0092 |

OTHER PUBLICATIONS

"Automated Lighting, Smart Thermostats & Climate Control" Sonic Systems, Retrieved from: https://www.sonicsystems.ca/lighting-climate-control/, Retrieved on: Aug. 16, 2021.
"Smart Home Lighting Automation and Climate Control" Leviton, Retrieved from: https://www.fmhometech.com.au/automation/lighting-and-climate-control/, Retrieved on: Aug. 16, 2021.

* cited by examiner

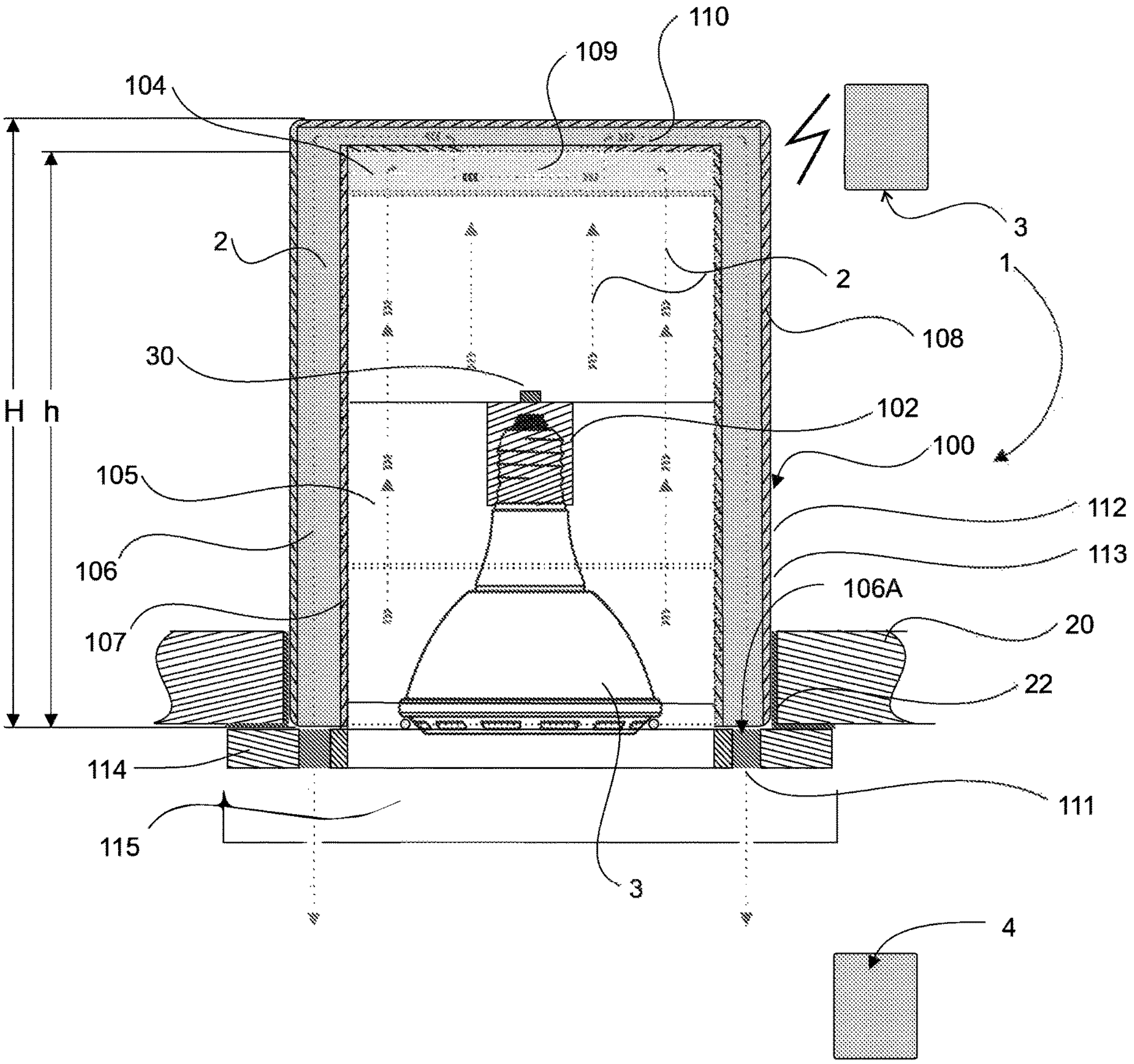
Fig 1

INDOOR LIGHTING AND CLIMATE SYSTEM

TECHNICAL FIELD

The present invention relates to an indoor lighting and climate system, comprising a plurality of lighting units arranged in a dispersed manner in a room and a control unit arranged to control the operation of the lighting units in relation to pre-set climate settings and input signals from at least one temperature sensor, wherein each of said lighting units includes a cup shaped housing with an opening, a lamp attachment for a lamp, an open inside space between said lamp and said cup shaped housing and a fan arranged to produce a forced air flow in said space.

BACKGROUND ART

There exists a great plurality of different systems for heating and/or cooling of a room. Many of the existing systems are not energy efficient. Others are based on complex technology. Still others acquire a lot of space. In a time when environmental issues have a greater and greater impact there is a need to look for new possibilities to provide heat and/or cooling.

A very energy efficient way of producing light is based on using LED lights also have the advantage that they may be provided in very compact designs. It is known to strive for regaining energy lost from LED lamps, i.e. energy in the loss of heat to provide a supply of heat to a room. However, these known systems are deficient in at least one aspect.

US2014043810 discloses a LED lamp having cooling means in the form of a fan built integrally with the lamp. US2010053967 discloses a LED lamp having cooling means in the form of a built-in fan that is also used for support of the lamp. KR20110000359 discloses a plurality of LED lamps arranged to supply heat to a ventilation channel with forced air flow by means of a joint fan. US2008165535 discloses a LED lamp having cooling means in the form of ventilation channels in the heat sink of the lamp, by means of a fan.

SUMMARY OF THE INVENTION

It is an object of the present invention to indoor lighting and climate system that may provide efficient heating and/or cooling, which is achieved by an indoor lighting and climate system according to claim 1.

Thanks to the use of the invention a cost-efficient use of energy may be achieved in buildings in combination with providing light.

Further aspects and advantages of the inventive concept may be apparent from the below.

BRIEF DESCRIPTION OF THE DRAWINGS

In the following, the invention will be described in more detail with reference to preferred embodiments and the appended drawings.

FIG. 1 shows a schematic cross-sectional side view of a lighting unit according to a first embodiment of the invention.

DETAILED DESCRIPTION

Figure 2:
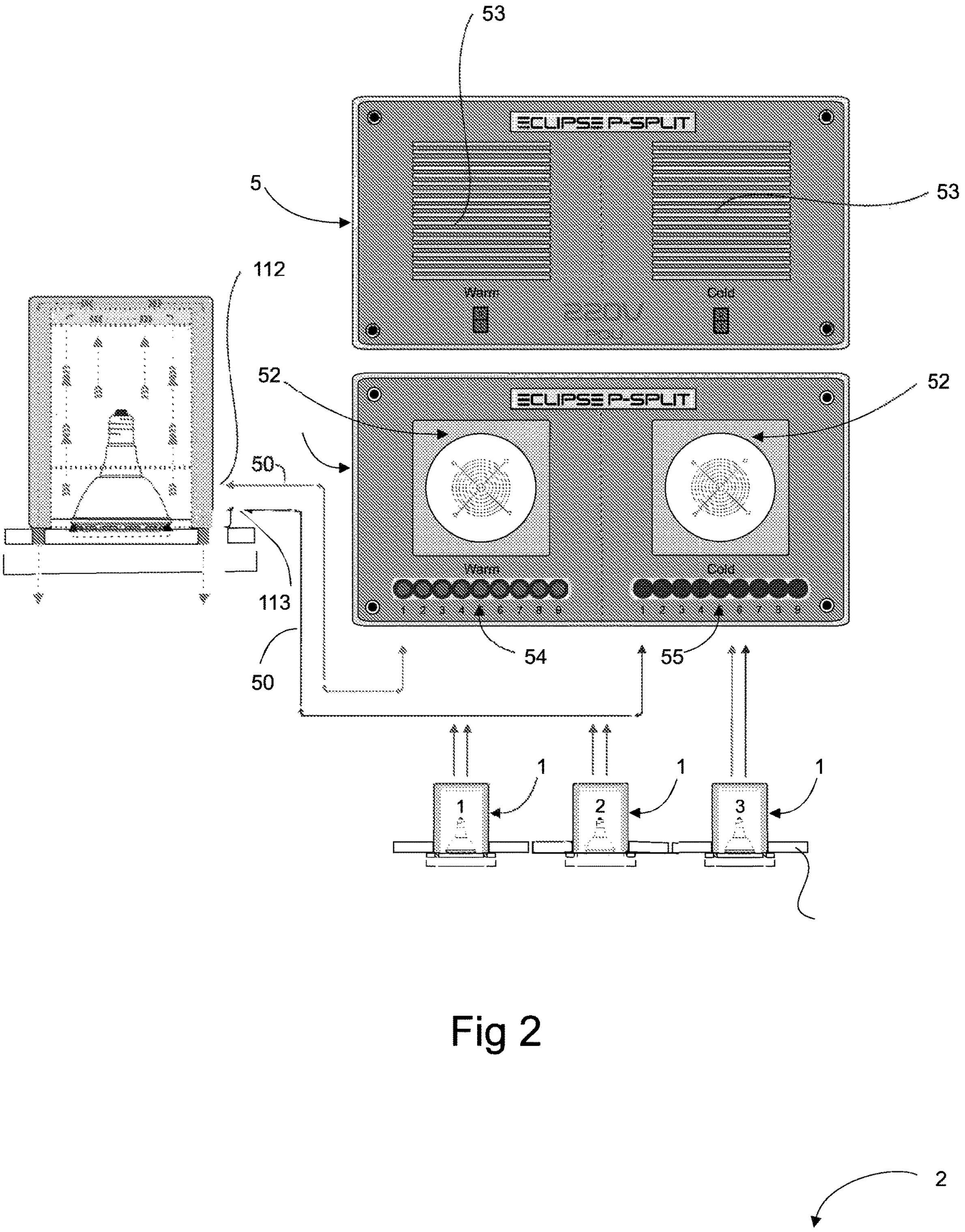
FIG. 2 shows a schematic view of a plurality lighting units connected to an external heating and/or cooling device, and also a schematic cross-sectional side view of a lighting unit connected to such an external heating and/or cooling device.

In FIG. 1 there is shown a single lighting unit 1 which in a schematic manner shows one embodiment of a lighting unit 1 included in an indoor lighting and climate system according to the invention, wherein a plurality of such lighting units 1 are used.

In the shown embodiment the lighting unit 1 is positioned in a ceiling 20 of a room 2. The positioning in a ceiling 20 is no way limiting, since it may as well be applied in a wall or a floor.

A control unit 3 is arranged in communication with the plurality of such lighting units 1 that are arranged within that room 2. At least one sensor 4 is arranged within the room 2 providing measurement signals to the control unit 3 to control each one of the lighting units 1 according to the predefined settings.

Each lighting unit 1 comprises a cup-shaped housing 100 with an opening 101 directed into the room 2. The cup-shaped housing 100 comprises an inner cup shaped member 107 enclosed at a distance by an outer cup shaped member 108, such that an annular channel 106 is formed between the two 107, 108. Within the housing 100 there is a lamp 103 attached to a lamp attachment 102. Between the housing 100 and the lamp 103 there is an inside space 105. Adjacent the bottom of the cup-shaped housing 100 there is arranged a fan 104. The fan 104 is arranged to produce a forced airflow 2 through the inside space 105. An inner side 107A of the inner cup shaped member 107, at least a cylindric wall part thereof, separates the open inside space 105 from the annular channel 106. The annular channel 106 is provided to lead the forced airflow out into the room 2.

Accordingly, there is a flow path 2 of air first entering into the lighting unit 1 centrally through an opening at the inlet 101 of the lighting unit 1 that passes through the open space 105 within the cup-shaped housing 100 and thereby absorbs heat from the lamp 103. The fan 104 further forces the airflow 2 into an opening 109 in the back wall 110 of the lighting unit 1 and then further on into the annular channel 106 that leads the airflow 2 out from the lighting unit 1 into the room 2.

In a preferred embodiment there is a filter 111 arranged adjacent the outflow from said flow channel 106, which filter 111 may improve the quality of air within the room by filtering out undesired particles.

In the embodiment that is shown in FIG. 1 the inlet 109 into the flow channel 106 is positioned at a large distance h from the front part of the lighting unit 1, which provides the advantage that the area used for absorption of heat of the airflow 2 is maximized in regard to the total height H of the lighting unit 1. However, it is of course feasible to have the inlet 109 at a lower position and still obtain the main advantages according to the invention, i.e. absorb heat from the lamp 103. In a preferred embodiment the distance h to the inlet 109 from the front part should be at least 50% of height H of the lighting unit, more preferred at least 70% and even more preferred at least 90%.

The lighting unit 1 is arranged with a sensor and a processor device 30 which is equipped with appropriate sensors, e.g. for temperature and possibly also further parameters such as airflow, humidity, etc. The processor is equipped with appropriate hardware and software to handle the desired needs in conjunction with individual control of the lighting unit 1 and to facilitate control signal exchange with the control unit 3, in order to control each one of the lighting unit 1 individually to provide individually adapted heat supply by each one of the lighting units 1.

As presented in FIG. 1 in a first embodiment the cup-shaped housing 100 may be in the form of an integral unit, including both the outer cup shaped member 108 and the inner cup shaped member 107 (or cylindrical inner wall 107) defining the annular outflow channel 106 between them. The lamp attachment 102 may be attached to the inner wall 107 in various manners as is evident for a skilled person within the field. The cup-shaped housing 100 may be positioned in a hole 21 in the ceiling 20/floor/wall having a shape adapted to the outer shape of the cup-shaped housing 100, which preferably is circular.

An attachment member 114, preferably a bayonet fixation, is used to fixate the housing 100 to attachment members 22 that are fixed to the ceiling 20, which may be achieved in various manners as is evident for the skilled person.

In FIG. 2 there is schematically presented an installation showing a plurality of lighting units 1 1.1, 1.2, 1.3 that are installed to supply both heat and cooling to a room (indicated in the lower right-hand part of FIG. 2). At the upper left-hand part of FIG. 2 there is schematically shown more in detail how one such lighting unit 1 may be connected to an external heating and/or cooling device 5. The heating and/or cooling device 5 includes a plurality of connection 54, 55 intended for connection to lighting units 1. Further, the external heating and/cooling device 5 includes a housing having air inlets 53 on at least one side thereof and fans 52 arranged to force air from the inlets 53 via heating and/or cooling members out into the connections 54, 55.

As seen in the upper left-hand side of FIG. 2 each lighting unit 1 by means of connections 112, 113 may be connected to the external heating and/or cooling device 5 via two tubes 50, 51, or indeed merely one such tube, e.g. if merely supply of heat is desired. The connections 112, 113 to the lighting unit 1 are preferably positioned close to the outlet of the heat flow channel 106. One of the tubes 50 is connected to a heat flow outlet from the external heating and/or cooling device 5, whereas the other tube 51 is connected to an outlet 55 of the cooling device of the heating and/or cooling device. Accordingly, the system shown in FIG. 2 may individually provide for controlled supply of either external heat to the out-flow channel 106 of the lighting unit 1 or extra heat, which may be automatically controlled by the control unit 3 by means of appropriately defined settings within the control program of the software used to control the control unit 3.

Figure 3:
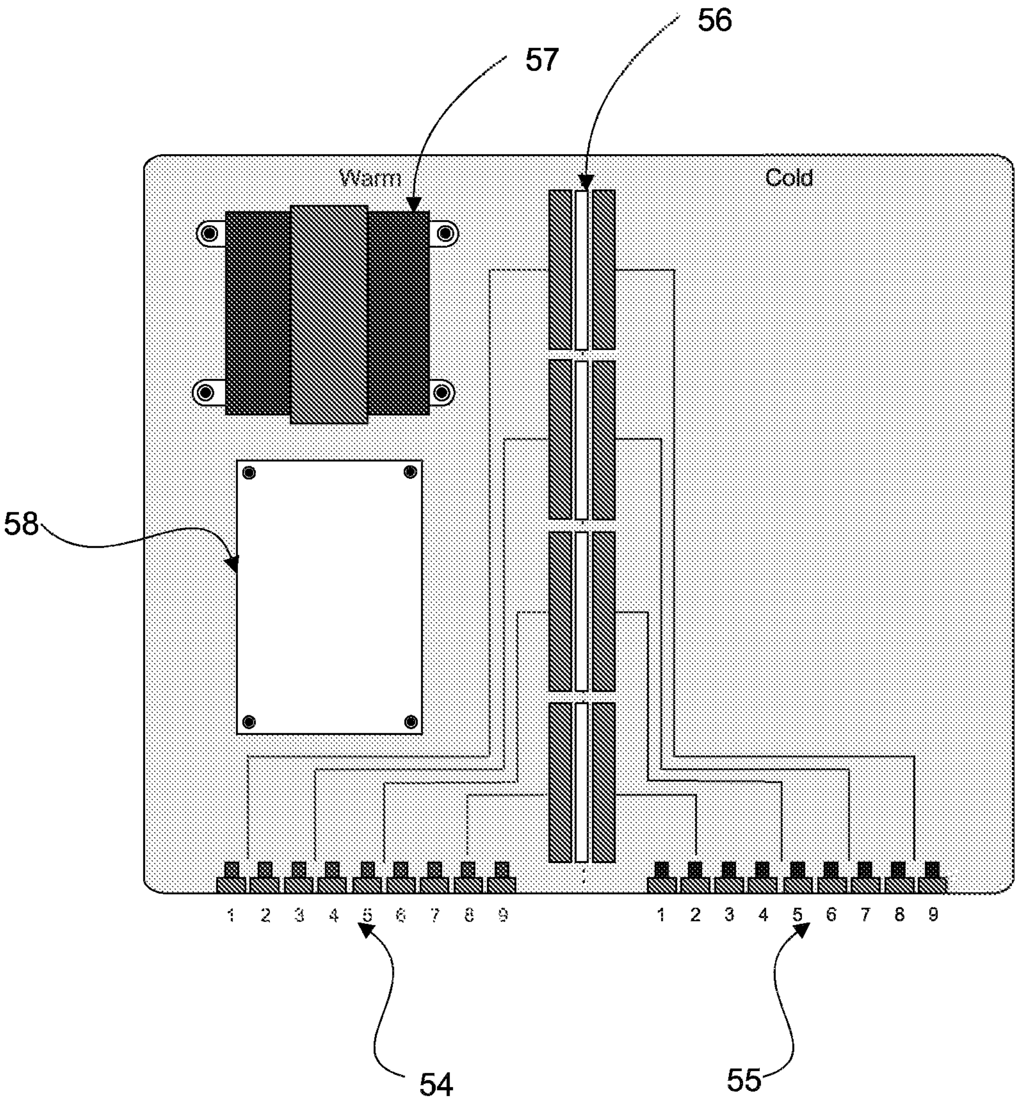
FIG. 3 shows a schematic design of an exemplary external heating and/or cooling device, and, FIG. 4 shows a a schematic cross-sectional side view of a lighting unit according to a second embodiment of the invention

In FIG. 3 there is shown an exemplary view of the inner of a heating and/or cooling unit 5. There is shown a plurality of heat and/or cooling producing elements 56, preferably in the form of peltier elements, providing cold air on one side and hot air on the other side being connected to at least one of the plurality outlets 54, 55, to supply heat and cooling respectively. There is also indicated a first sub-unit 57 and second sub-unit 58, e.g. power supply unit and control unit respectively.

Figure 4:
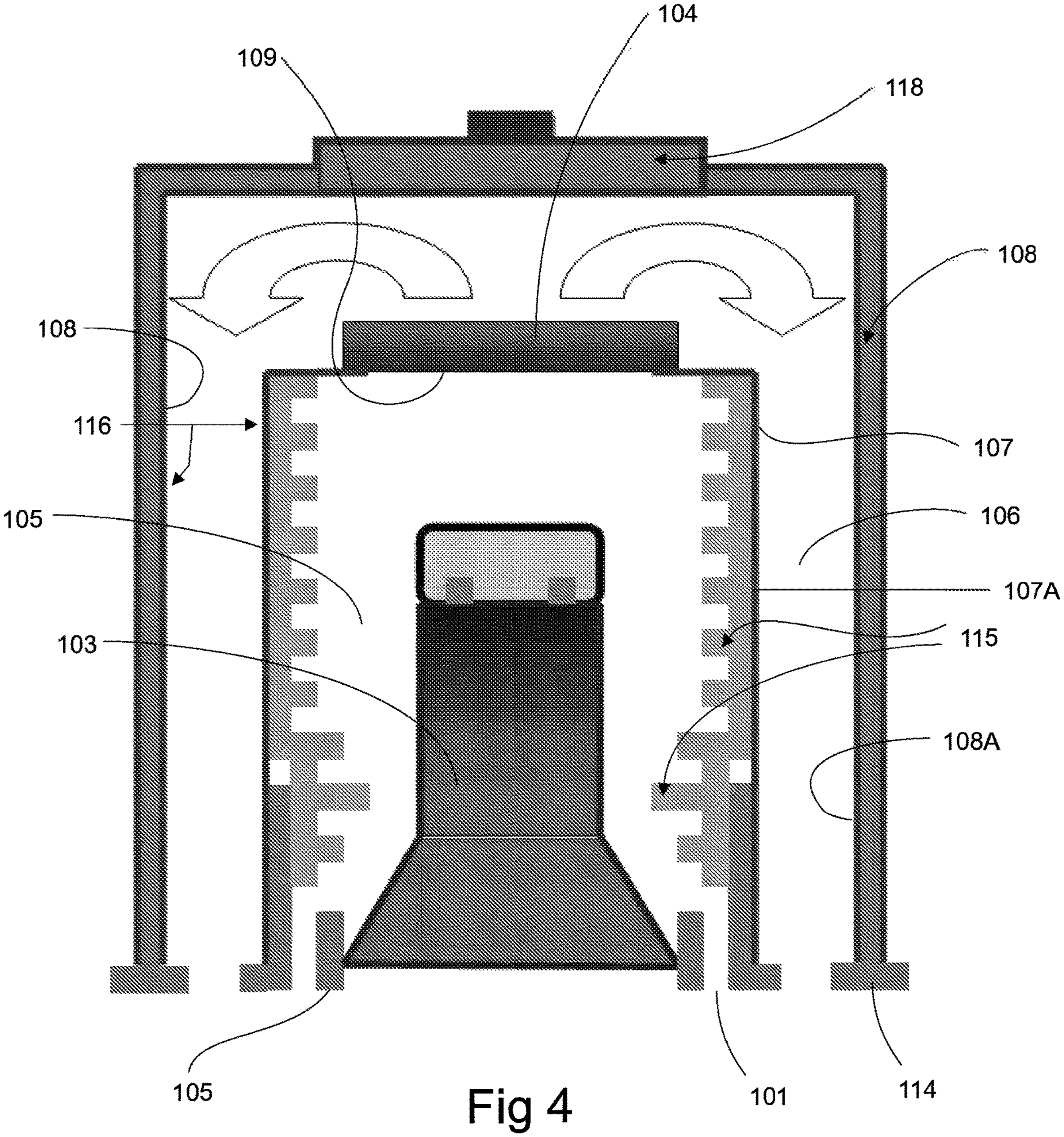

In FIG. 4 there is shown a modified embodiment of a lighting unit 1 according to the invention. Most basic features of the modified embodiment are the same as have been described above and will not be repeated, instead there will a focus on different features.

One main difference is that the cup-shaped housing 100 in this embodiment is not integral but instead there is a separate outer cup shaped member 108 and a separate inner cup shaped member 107 forming the heat flow channel 106 between them. Accordingly, the outer cup shaped member 108 has a larger cup-shaped form than the inner cup shaped member 107. Further, it is shown that at the inner wall of the inner cup shaped member 107 there may be formed turbulence creating elements 115, and or swirl creating, intended to increase heat convection from the lamp 103 to the air flow during passage through the open space 105. Moreover, it is shown that isolating and/or heat repelling surface layers 116 may be applied to at least one of walls 107A, 108A forming the outlet channel 106, preferably both walls 107A, 108A. Further an inspection lid 118 may be arranged.

In an alternative configuration one or more lamp/s 3 may be arranged with a further heat generating device, e.g. heat resistance device (e.g. resistance wire), that may be activated at times when there is a need of further heat delivery. In this manner there is provided an even large range within which an arrangement according to the invention may operate, to fulfil desires regarding indoor climate.

The invention is not limited to that described above but may be varied within the scope of the claims. It is realized that many supplementing functions may be achieved by appropriate software in the central control unit, e.g. a built-in technical solution for a plurality of lighting units in a room, e.g. LED lamps, with a so-called "Wake up" function, where the power of the lighting units progressively increase and possibly according to a predefined pattern producing an effect similar to sun rise.

The invention claimed is:

1. An indoor lighting and climate system, comprising:

a plurality of lighting units arranged in a dispersed manner in a room; and a control unit arranged to control one or more operations of the lighting units in relation to pre-set climate settings and input signals from at least one temperature sensor, wherein:

each of said lighting units includes:

a cup shaped housing with an opening, a lamp attachment configured to removably receive a lamp, an inner cup shaped member arranged within said cup shaped housing;

an open inside space between said lamp and said inner cup shaped member, wherein the open inside space provides a heat flow inlet;

the inner cup shaped member comprising a circumferentially extending inner dividing wall separating said open inside space from an annular part of an outlet heat flow channel arranged within said cup shaped housing; and an inlet to the heat flow channel configured to permit access to the heat flow channel from the open inside space, the inlet located on a side of the inner dividing wall member opposite the opening;

a fan arranged to produce a directed air flow following a path of air entering the open inside space from the room, passing the lamp, into the outlet heat flow channel via the inlet, and out into the room via the annular part of the outlet heat flow channel;

at least one of said lighting units is arranged with an additional heat or cooling supply device that comprises a first additional inlet to said heat flow channel; and said first additional inlet is connected to an external heating and/or cooling device via a first inlet tube.

2. The indoor lighting and climate system according to claim 1, wherein a filter is arranged at or within said heat flow channel and adjacent an outlet opening of said heat flow channel.

3. The indoor lighting and climate system according to claim 1, wherein the inlet of said outlet heat flow channel is positioned a distance above said opening, wherein said distance is at least 50% of the height of the lighting unit, and wherein said inlet is an opening in the back wall of the inner cup shaped member.

4. The indoor lighting and climate system according to claim 1, wherein said fan is arranged at said bottom part.

5. The indoor lighting and climate system according to claim 1, wherein said lighting unit is arranged with a sensor and processor device arranged to provide individual control of operations of said fan.

6. The indoor lighting and climate system according to claim 1, wherein said lighting unit comprises turbulence and/or swirl creating elements.

7. The indoor lighting and climate system according to claim 1, wherein at least one surface delimiting said heat flow channel is applied with an isolating and/or heat repelling surface layer.

8. The indoor lighting and climate system according to claim 1, wherein at least one of said lighting units is arranged with first and second additional inlets to said heat flow channel.

9. The indoor lighting and climate system according to claim 8, wherein:

said first additional inlet is connected to a heating part of an external heating device and cooling device via a first inlet tube, and said second additional inlet is connected to a cooling part of said external heating device and cooling device via a second inlet tube.

10. The indoor lighting and climate system according to claim 1, wherein said additional heat or cooling supply device is arranged with a plurality of connections for connecting a plurality of lighting units.

11. The indoor lighting and climate system according to claim 1, wherein said additional heat or cooling supply device comprises an additional heat generating device arranged within at least one of said lighting units.

12. The indoor lighting and climate system according to claim 11, wherein said additional heat or cooling supply device is integrated into said lamp.

13. The indoor lighting and climate system according to claim 1, wherein a filter is arranged at or within said heat flow channel.

14. An indoor lighting and climate system, comprising:

a plurality of lighting units arranged in a dispersed manner in a room; and a control unit arranged to control one or more operations of the lighting units in relation to pre-set climate settings and input signals from at least one temperature sensor, wherein:

each of said lighting units includes:

a cup shaped housing with an opening, a lamp attachment configured to removably receive a lamp, an inner cup shaped member arranged within said cup shaped housing;

an open inside space between said lamp and said inner cup shaped member, wherein the open inside space provides a heat flow inlet;

the inner cup shaped member comprising a circumferentially extending inner dividing wall separating said open inside space from an annular part of an outlet heat flow channel arranged within said cup shaped housing; and an inlet to the heat flow channel configured to permit access to the heat flow channel from the open inside space, the inlet located on a side of the inner dividing wall member opposite the opening;

a fan arranged to produce a directed air flow following a path of air entering the open inside space from the room, passing the lamp, into the outlet heat flow channel via the inlet, and out into the room via the annular part of the outlet heat flow channel;

at least one of said lighting units is arranged with an additional heat or cooling supply device;

at least one of said lighting units is arranged with first and second additional inlets to said heat flow channel;

said first additional inlet is connected to a heating part of an external heating device and cooling device via a first inlet tube, and said second additional inlet is connected to a cooling part of said external heating device and cooling device via a second inlet tube.

15. An indoor lighting and climate system, comprising:

a plurality of lighting units arranged in a dispersed manner in a room; and a control unit arranged to control one or more operations of the lighting units in relation to pre-set climate settings and input signals from at least one temperature sensor, wherein:

each of said lighting units includes:

a cup shaped housing with an opening, a lamp attachment configured to removably receive a lamp, an inner cup shaped member arranged within said cup shaped housing;

an open inside space between said lamp and said inner cup shaped member, wherein the open inside space provides a heat flow inlet;

the inner cup shaped member comprising a circumferentially extending inner dividing wall separating said open inside space from an annular part of an outlet heat flow channel arranged within said cup shaped housing; and an inlet to the heat flow channel configured to permit access to the heat flow channel from the open inside space, the inlet located on a side of the inner dividing wall member opposite the opening;

a fan arranged to produce a directed air flow following a path of air entering the open inside space from the room, passing the lamp, into the outlet heat flow channel via the inlet, and out into the room via the annular part of the outlet heat flow channel;

at least one of said lighting units is arranged with an additional heat or cooling supply device that comprises a first additional inlet to said heat flow channel; and said additional heat or cooling supply device is arranged with a plurality of connections for connecting a plurality of lighting units.

* * * * *